(12) United States Patent
Jackson (10) Patent No.: US 6,447,058 B1
(45) Date of Patent: Sep. 10, 2002

(54) SEAT MEANS FOR PREVENTING SHOCK (75) Inventor: Donna K. Jackson, Fort Worth, TX (US)

(73) Assignee: Nubax Vertical Innovations, LLC, Fort Worth, TX (US)

( * ) Notice: Subject to any disclaimer, the term of this patent is extended or adjusted under 35 U.S.C. 154(b) by 0 days.

(21) Appl. No.: 09/602,344

(22) Filed: Jun. 24, 2000

Related U.S. Application Data (60) Provisional application No. 60/141,200, filed on Jun. 25, 1999.

(51) Int. Cl.[7] .................................................. B60N 2/42
(52) U.S. Cl. .............................. 297/216.13; 297/452.37
(58) Field of Search ...................... 297/DIG. 1, 452.37, 297/452.27, 216.1, 216.13, 216.14, 452.32, 452.35

(56) References Cited

U.S. PATENT DOCUMENTS

| | | | | |
|---|---|---|---|---|
| 3,000,020 A | * | 9/1961 | Lombard et al. | |
| 3,612,607 A | * | 10/1971 | Lohr | |
| 3,833,259 A | * | 9/1974 | Pershing | |
| 3,833,260 A | * | 9/1974 | Harder, Jr. | |
| 4,027,843 A | * | 6/1977 | Thompson | |
| 4,572,578 A | * | 2/1986 | Perkins | |
| 4,673,216 A | * | 6/1987 | Alfer | |
| 4,696,516 A | | 9/1987 | Yeum | |
| 4,718,727 A | * | 1/1988 | Sheppard | |
| 4,726,086 A | * | 2/1988 | McEvoy | |
| 4,819,288 A | * | 4/1989 | Lowthian | |
| 4,835,801 A | * | 6/1989 | Walpin et al. | |
| 4,837,881 A | | 6/1989 | Kondo et al. | |
| 5,000,515 A | * | 3/1991 | Deview | |
| 5,039,158 A | * | 8/1991 | Maier | |
| 5,114,209 A | | 5/1992 | Dunn | |
| 5,269,590 A | | 12/1993 | Carilli | |
| 5,294,181 A | * | 3/1994 | Rose et al. | |
| 5,396,671 A | | 3/1995 | Stacy | |
| 5,452,940 A | | 9/1995 | Maier | |
| 5,553,924 A | | 9/1996 | Cantor et al. | |
| 5,713,631 A | | 2/1998 | O'Neill | |
| 5,855,415 A | * | 1/1999 | Lilley, Jr. | |

FOREIGN PATENT DOCUMENTS

WO     WO99/20210     4/1999

OTHER PUBLICATIONS

Cary, B. "Back Pain Backlash—The Spine" Jul. 24, 2000 Los Angeles Times, Health Section, pp. 51 & 56.

* cited by examiner

Primary Examiner—Milton Nelson, Jr.
(74) Attorney, Agent, or Firm—Peter Jon Gluck, Esquire; M. E. Wolff; Patent Law Firm, P.C.

(57) ABSTRACT

An improved spinal disc protection and seat shock prevention system for use in conjunction with known seating provides a density differential based method for cradling and bracingly protecting a user's spinal, orientation by angled apparatus for receiving a user's ischial tuberosity in combination with a substantially vertical member comprised of foam, gel or the like silicones or polysiloxanes.

3 Claims, 8 Drawing Sheets

SEAT MEANS FOR PREVENTING SHOCK

CROSS-REFERENCE TO RELATED APPLICATIONS

The instant application claims Priority of U.S. Ser. No. 60/141200 -Jun. 25, 1999, in the name of Donna K. JACKSON, inventress of record.

BACKGROUND OF THE INVENTION

1. Field of Invention

The present invention relates generally to an improved system for padding the area which receives the ischial tuberosity and back of a user to prevent mechanical loading and insult thereto, generally embodied in seat means, or the like layered system for preventing spinal shock, particularly to an enhanced ergonomic seat design for use in blocking, ameliorating or mitigating lower back insult, pain and debilitation.

2. Related Art

Attention is called to the following U.S. Pat. Nos.:
5,713,631; 5,553,924; 5,452,940; 5,396,671; 5,269,590; 5,114,209; 4,837,881; 4,699,427; 4,696,516; 4,571,763; 4,555,137; 4,522,447; 4,190,697; 3,874,731; 3,606,463; and 3,086,317. Each of these patents has been studied and found to be technically distinct from the instant teachings, and those found to be material are at least one of further discussed and cited concurrently or concomitantly with the instant submission.

As leading experts opine that lower back pin comprises a cost approaching $100 billion per annum in the United States alone, and almost 20% of the population in the U.S. is impacted during their lifetime, little attention has been focused upon simple mechanical and gross anatomic factors to treat this problem. Plethoric attempts in the art merely highlight the long unrequited need for the instant teachings.

SUMMARY OF THE INVENTION

The present invention expressly incorporates by reference WO99/20210, [PCT/US98/22205] which was invented by the present inventor, and renders the discussion of plastics herein cognizable to one having ordinary skill in the art.

The system is characterized by combining all the elements and components necessary for preventing shock to a user's spine while seated, with a mechanism for reducing vibration imparted to a user's spine under various conditions. Likewise, the instant teachings encompass emplacing at least all of the same into a configuration suitable in a seating device for high performance driving and or endurance seating endeavors (for example, in an airplane, boat, office chair, golf cart, tractor, or the like settings) in addition to proven applications within the trucking context (for example, '18 wheelers'), bicycles, automobiles, office chairs, cushions, airplanes, trains, boats and motorcycles, inter alia.

Briefly stated, there is provided an improved spinal disc protection and seat shock prevention system for use in conjunction with known seating means provides a density differential based means for cradling and bracingly protecting a user's spinal orientation by angled means for receiving a user's ischial tuberosity in combination with a substantially vertical member comprised of foam, gel and the like silicones or polysiloxanes.

According a feature of the instant teachings there is provided, a substantially vertical seating supplement component having a means for bracingly supporting a predetermined aspect of the users' spine, integrally combined with and substantially orthogonal to a substantially horizontal extension component, each of said components defined by at least a dual density construction having an external portion which is of a relatively higher density then an inner portion whereby the spine is aligned in fixed spatial relationship with the dual density construction when a user is disposed therein.

According to a feature of the present invention, there is provided a seat means for maintaining a user's spine in a substantially lordotic position, which comprises, a substantially vertical member made up of strips of material having a first density disposed about a slotted area having a second density, a v-shaped cushion means for holding the ischial tuberosity of a user; and a means for calibrating and fixing an angle between the substantially vertical member and the v-shaped cushion means for holding.

According to yet a still further feature of the invention, there is provided a spinal disc protection and seat shock prevention system comprising, a substantially vertical member with a first density, having a grooved face for receiving a users' back of a second density, comprised of foam, gel and the like silicones or polysiloxanes, angled cushion means for receiving a user's ischial tuberosity integral therewith, and likewise being of at least two respective densities, wherein the angle between said substantially vertical member and the angled cushion means is between about 1 and about 15 degrees, while the distal end of the cushion angles upward from between about 1 to about 3 degress, optimally.

Improved ergonomic seat design constitutes an area for which longstanding needs remain to be met, despite rapid advances in materials' science and biomedical engineering. Namely, although reams of data have been generated relative to the effects of seated postural loading upon the human spinal system, and concomitant advances in bioprosthetics subsume many artisans' attentions, nary have the two been wedded prior to the advent of the present invention.

The above described and many other features and attendant advantages of the present invention will become apparent by reference to the following detailed description when considered in conjunction with the accompanying drawings.

DETAILED DESCRIPTION OF THE PREFERRED EMBODIMENTS

The present inventor has discovered that by varying the density of seating materials and uniquely positioning the same, it is possible to mitigate spinal insult through anatomical support of the spine & tailbone complex, which protects the same from both impact and constant vibration damage. Heretofore no approach has combined the position of a bottom cushion and back support to impart a proper angle and load mitigating design.

It is noted that the instant specification is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Considering the spinal system as including merely the vertebrae, disks, ligaments and muscles, the disks would be the 'shock-absorbers' or major weight bearing portions in a strict functional sense. A disks' inner portion further comprises dynamic system made up of a viscous material which equilibrates itself by drawing fluid from surrounding areas. A nuclear aspect of the innermost portion of the disk is designed to resist mechanically compressive forces. Fibrocatilagenous rings make up the outer portion of the disk and provide a collagen based level of strength and elasticity that counters tensile forces acting as an annulus.

Movement and postural changes induce a pump-like mechanism that alters intradiscal pressure, often narrowing the disk in a harmful way over time. As the function of each involved disk as a shock absorber is operationalized in terms of its gross anatomy, the problem becomes clear in that the wrong stresses flatten both the individual disks and desired emergent spinal contours. The teachings of the present invention address and correct these issues by providing a mechanism to alleviate the ongoing human suffering caused by stationary and vehicle seating.

In short, chronic back pain is often derived from a deformation of disc structure owing to deviations from the natural lordotic or "s"/sigmoid curved posture. When the human spine is 'slumped' the natural curve disappears and the spines' vertebrae receive pressure, owing to unfavorable mechanical loading and issue iterated above, inter alia.

Plethoric examples of seat designs (including the numerous patents studied, as enumerated above) have failed to address the exact anatomical support required by using a symmetrically raised portion on the cushions to support the spinal column or tailbone. Proper support mitigates poor posture, weakened and fatigued back muscles and chronic back pain.

In a preferred embodiment of the present invention, a longitudinal vertical region receives the spine of one disposed upon a seat means, and a density differential between peripheral and central portions of the longitudinal vertical region houses and shields the user's spine from insult.

Likewise according to a preferred embodiment, a 'v-shaped' bottom cushion angles upward from a point of contact near the back cushion to a height of about four inches, having a mean angle of between about 2.2 to about 2.7 degrees, more preferably about 2.5 degrees. This angle has been discovered to facilitate an optimized lordotic loading, or impart to the spine a pareto-optimal "s"/sigmoid curvature asymptotically approaching the minimized loading posture.

Figure 1:
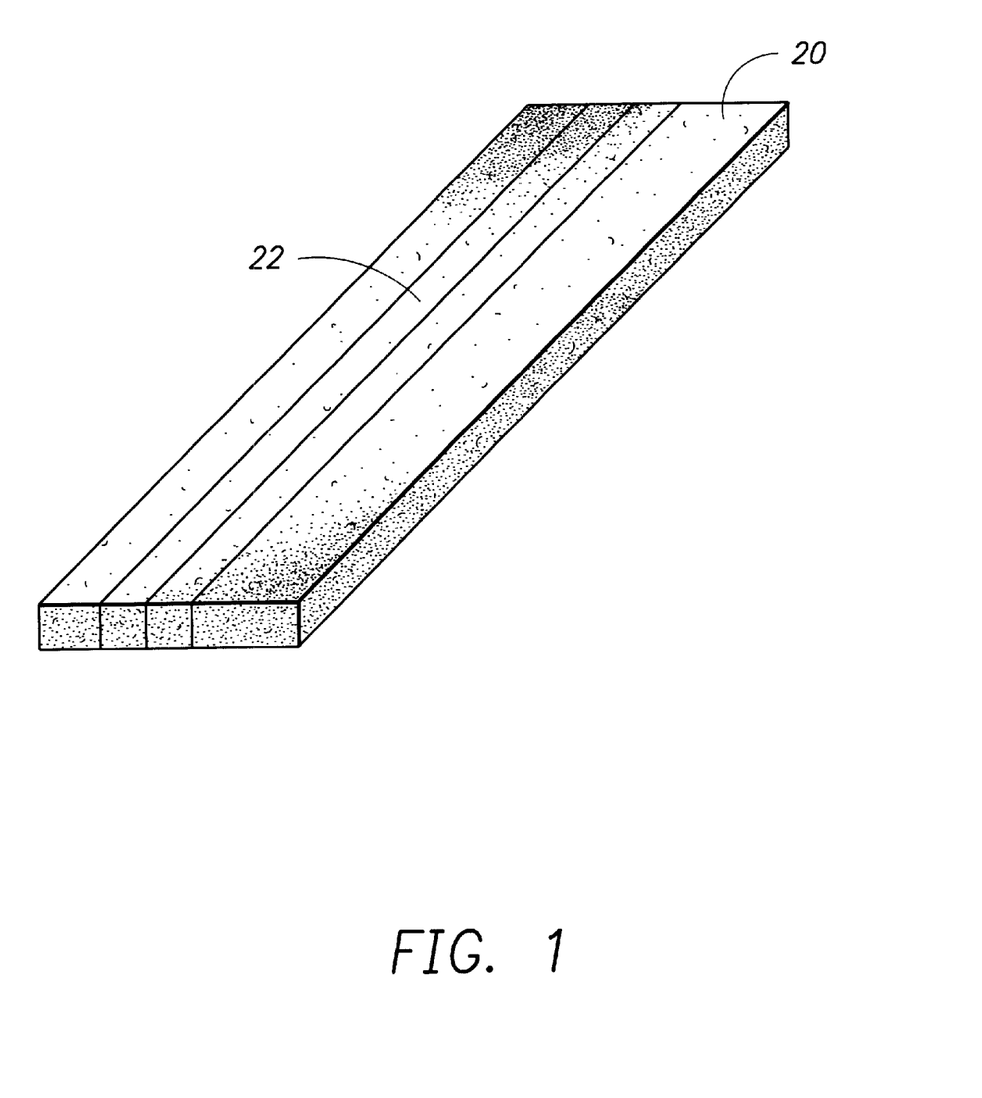
FIG. 1 is a plan view of dims used to provide a plurality of strips of constituent material for use with a device according to embodiments of the present invention.

Referring to FIG. 1 a plan view of dims 20 as known to those skilled in the art, such as is used to provide a plurality of strips of first constituent material 22 for use with apparatus; 38 (not shown) according to embodiments of the present invention. Those having a modicum of skill in the art will readily comprehend that material strips 22 consisting essentially of foam, silicone and mixtures or combinations thereof is conventional and/or disclosed in applicant's co-pending publication by the WIPO under publication no. WO99/20210, which is the publication of PCT/US98/22205, and has been expressly incorporated by reference herein.

Polymeric polysiloxanes, silicones, gels, admixtures, and the entire surrounding family of plastic and rubber molecules have been explored by the instant inventor, a leading and Certified Prosthetist, for the last two decades. What has been discovered is that by varying regions of relative density an actual mechanical and structural enhancement to existing seat designs is possible.

Likewise, as discussed in WO99/20210 [PCT/US98/22205] formulaic and formulational generation of the instant dims 20, housing material strips 22 is either known or taught by applicant's technological disclosures including any required know-how and show-how, in addition to sources of the actual compounds used. The substitution of related materials is similarly conventional. It is also understood that for use with, for example, airplane seating, certain FAA regulations and design requirements related to foam densities are complied with. Likewise, the same are expressly contemplated by the instant teachings. As enumerated within the claims appended hereto, respective foam densities on the order of from about 20 lbs pressure sensivity to about 200 lbs pressure sensivity are functionally operational within the context of the instant teachings. Both closed cell and open cell foam are also useful for the purposes of the instant teachings.

Figure 2:
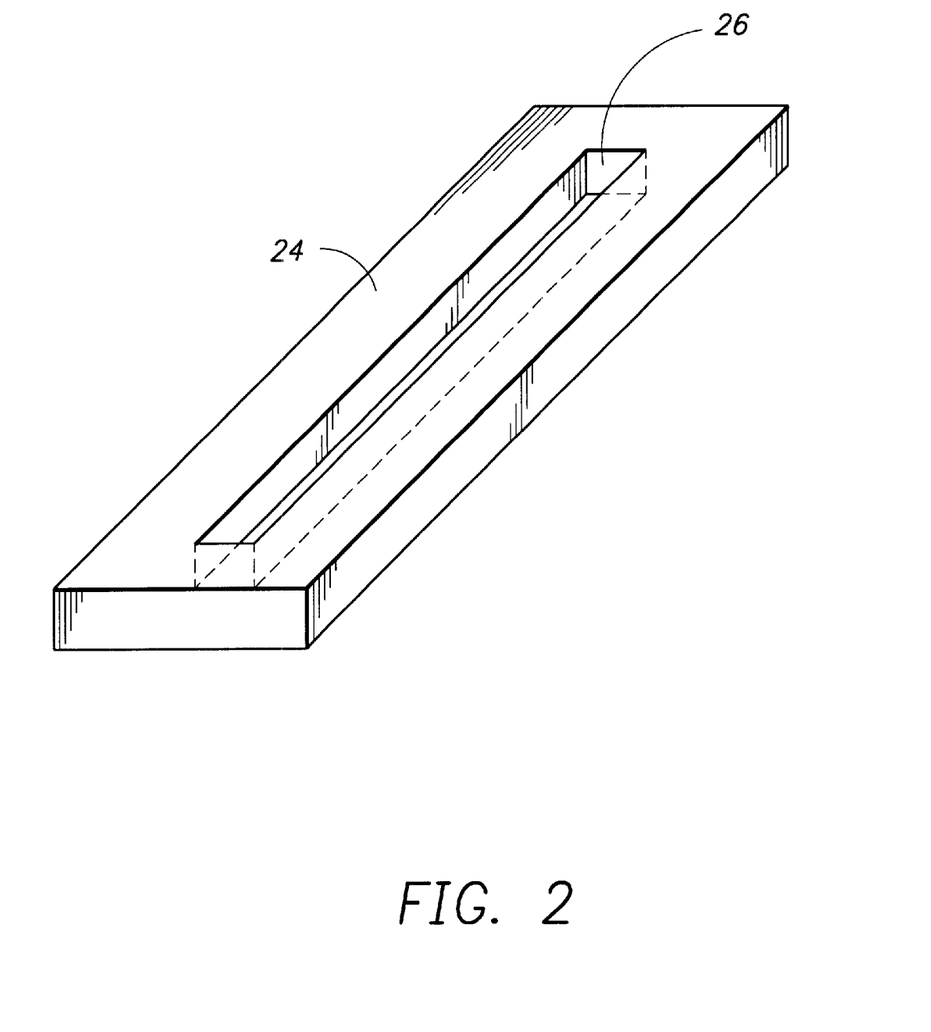
FIG. 2 is a mold for generation of an aspect of a device according to embodiments of the present invention.
Figure 3:
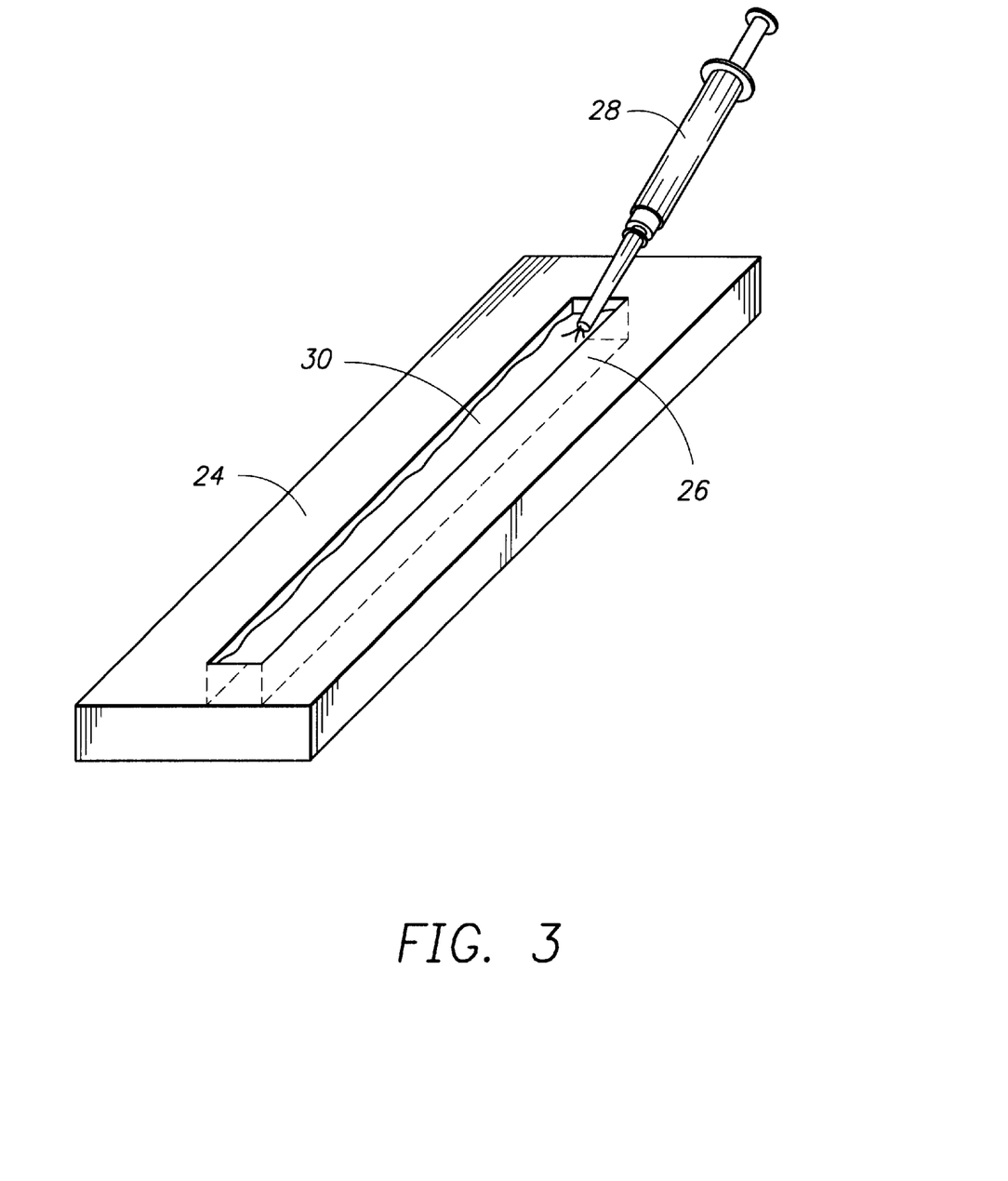
FIG. 3 is a view of a system according to the present invention for molding an aspect of a device according to embodiments of the present invention as used with FIG. 2.
Figure 5:
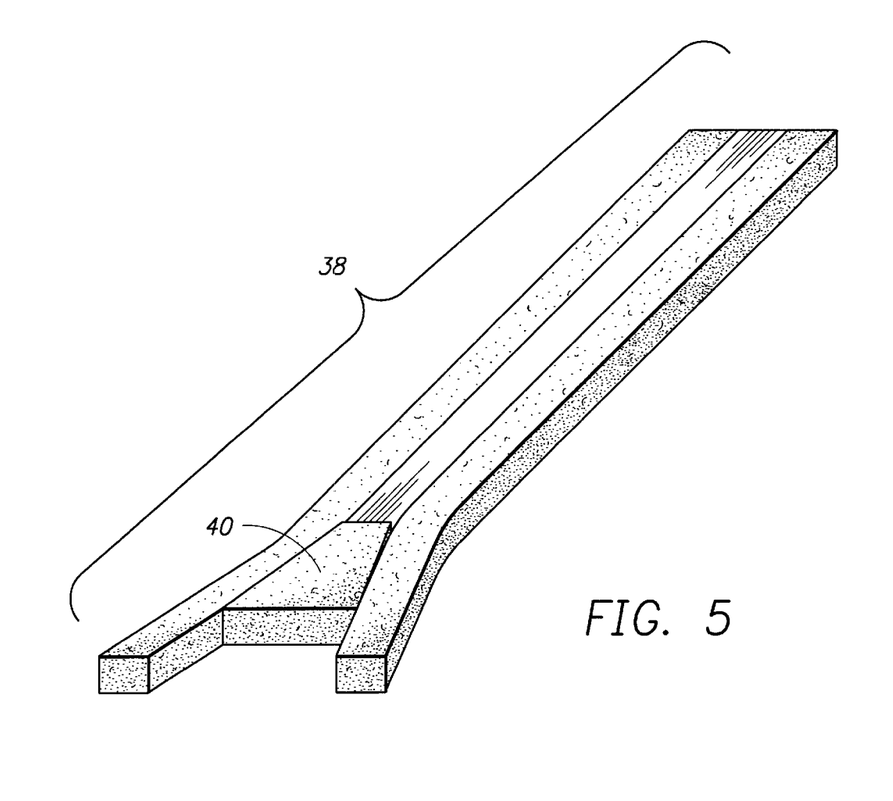
FIG. 5 is a schematic plan view of a final assembly used with any number of conventional seating means according to embodiments of the present invention.
Figure 8:
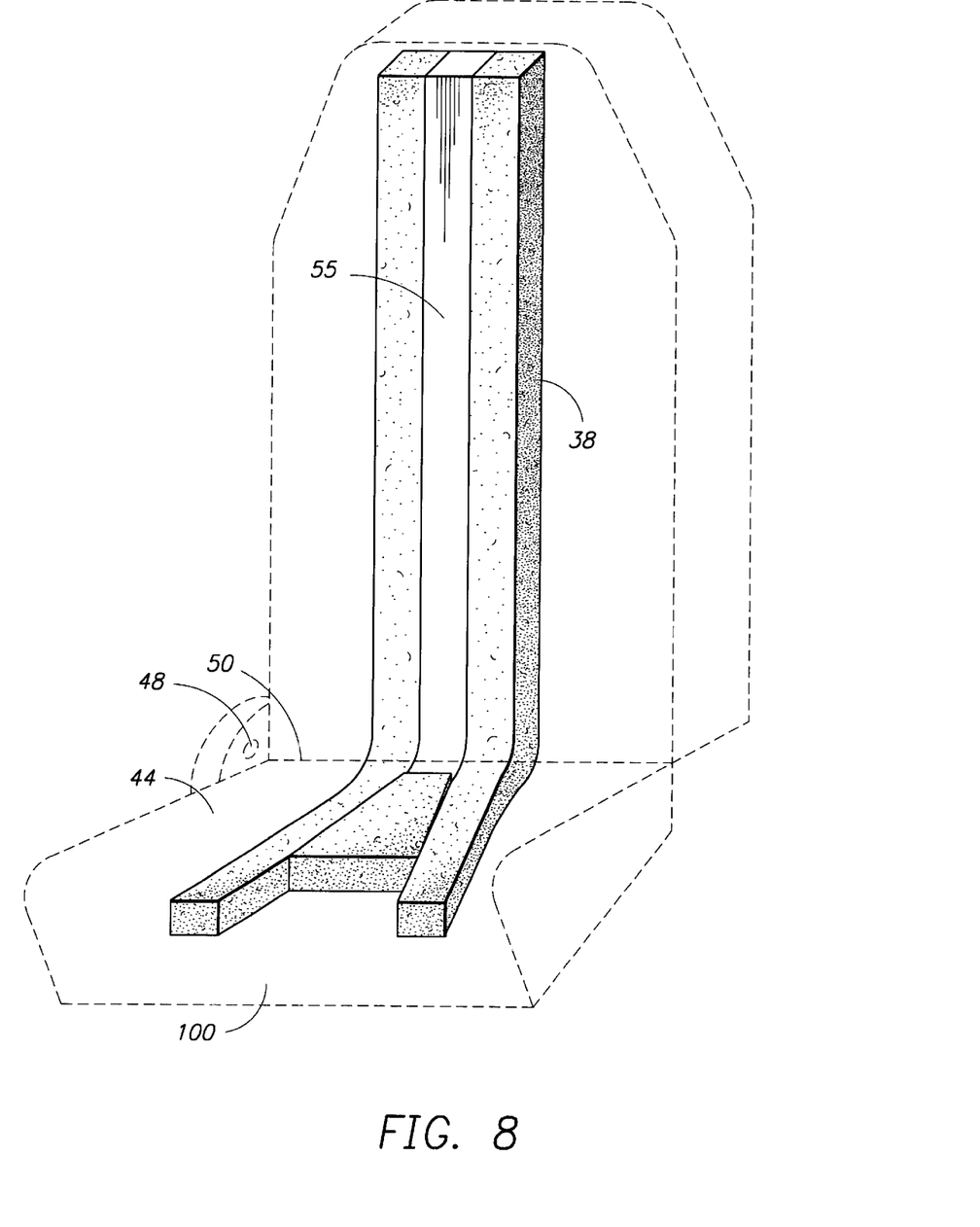
FIG. 8 is a schematized view of a conventional seat means showing the addition of a final assembly used with any number of conventional seating means according to embodiments of the present invention as shown in FIG. 5–FIG. 7.

Referring now to FIG. 2, and to FIG. 3, mold 24 has a trough-like means 26 for receiving a gel-like precursor to the second constituent material which may be injected into, for example a preferred embodiment shown here as recess or groove 30 which works with the present invention 38 ( Not shown in these views but, see, for example completed apparatus/assembly 38 as shown in FIG. 5 and in FIG. 8), with a workplace 28 having properties of a conventional piston-loaded dispenser, cured and removed. Alternately as discussed in applicant's WO99/20210 [PCT/US98/22205] other known processes to generate apparatus 38 may be used. It is noted that for the second constituent material, foam densities on the order of from about 1 lb pressure sensitivity to about 83 lbs pressure sensitivity are functionally operational within the context of the instant teachings. Both closed cell and open cell foam are also useful for the purposes of the instant teachings.

Figure 4:
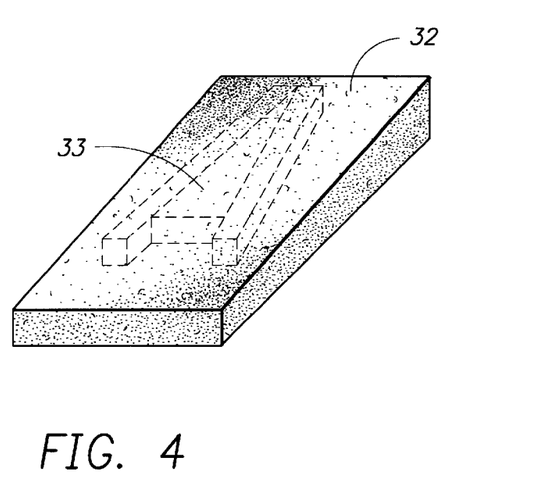
FIG. 4 is a plan view of dims used to provide a triangular member of constituent material for use with a device according to embodiments of the present invention.

Referring now to FIG. 4, dims 33 used to provide a desired portion 31 of triangular member 40 has a proximate end 32 which is attached to the rest of the assembly and is made of first constituent material for use with apparatus 38 according to embodiments of the present invention is shown. As fully enumerated within the claims appended hereto, respective foam densities on the order of from about 20 lbs pressure sensivity to about 200 lbs pressure sensivity are functionally operational within the context of the instant teachings. Both closed cell and open cell foam are also useful for the purposes of the instant teachings.

Figure 4B:
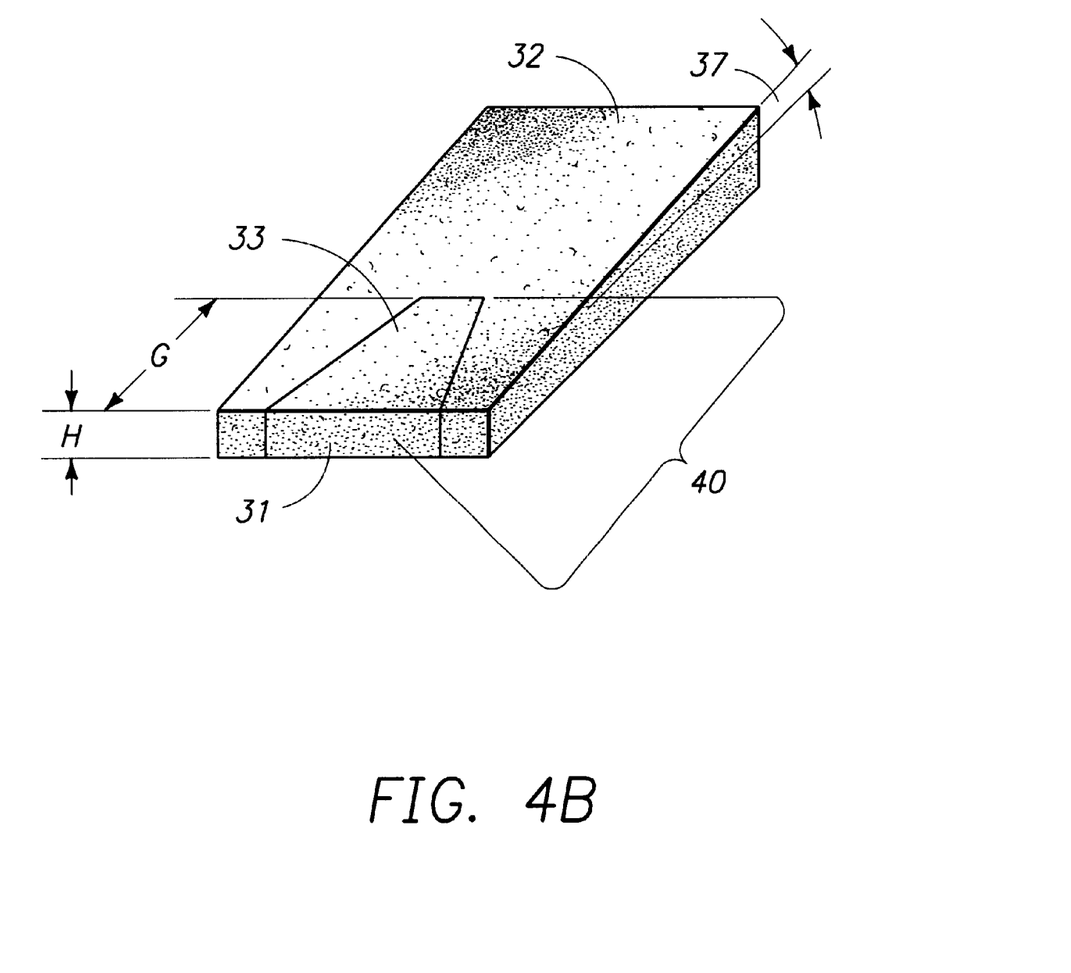
FIG. 4B shows an angularly inclined pre-form to the v-shaped cushion member, according to embodiments of the present invention.

Turning to FIG. 4B, a detailed view of bottom cushion 40 is shown as the same is still part of dims 33. A distal end of this assembly 31, is angled measured by 37 upward toward proximate end 32. The angled v-shaped cushion portion significantly is angled from a distal to a proximate end of the cushion measured by inclination angle 37 preferably from 1 to about 3 degrees. IN preferred embodiments prototyped to dated, the angle is preferred at about 2.0 to about 2.8 degrees, most preferably under about 2.2 degrees. This angle has been discovered to facilitate an optimized lordotic loading, or impart to the spine a pareto-optimal "s"/sigmoid curvature asymptotically approaching the minimized loading posture. Those skilled likewise shall adjust this angle and the angle between the cushion means and the substantially vertical member as needed based upon the involved use and seat.

FIG. 5 shows apparatus 38 fully assembled, as would be conventionally known to those skilled in the art in terms of assembly, triangular member 33 has been angled and molded to yield a pre-form used with the strips 22 to form apparatus 38. It is noted that silicones, gels, and/or foams involved can be mixed and matched to achieve the desired densities.

Figure 6:
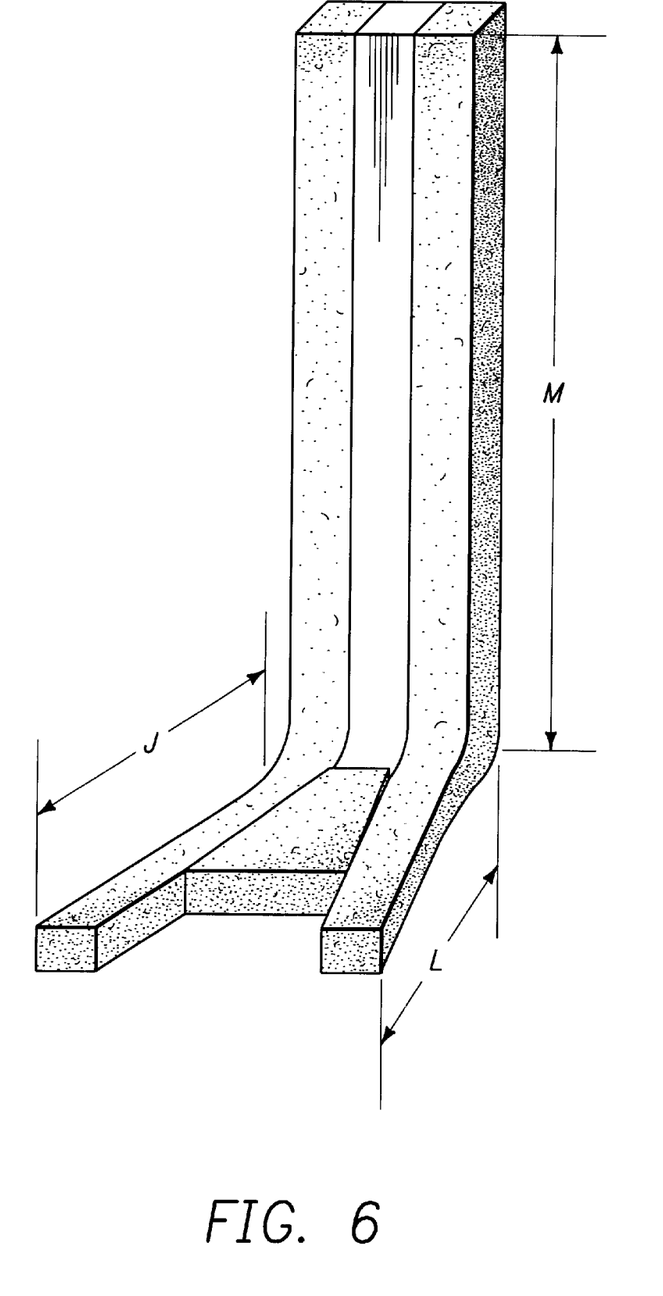
FIG. 6 is additional view of a final assembly used with any number of conventional means according to embodiments of the present invention as shown in FIG. 5.

Likewise, referring to FIG. 6 substantially vertical portion M angles in one ordinal plane, while substantially horizontal portions J and L are defined by an axis substantially orthogonal to M, or in a horizontal plane. It is at this point that the objects of the present invention are denoued. Unlike conventional seating schemes and mechanisms, in lieu of keeping the J and L portions as shown in this figure an upward angle is imparted to the entire lower assembly.

Figure 7:
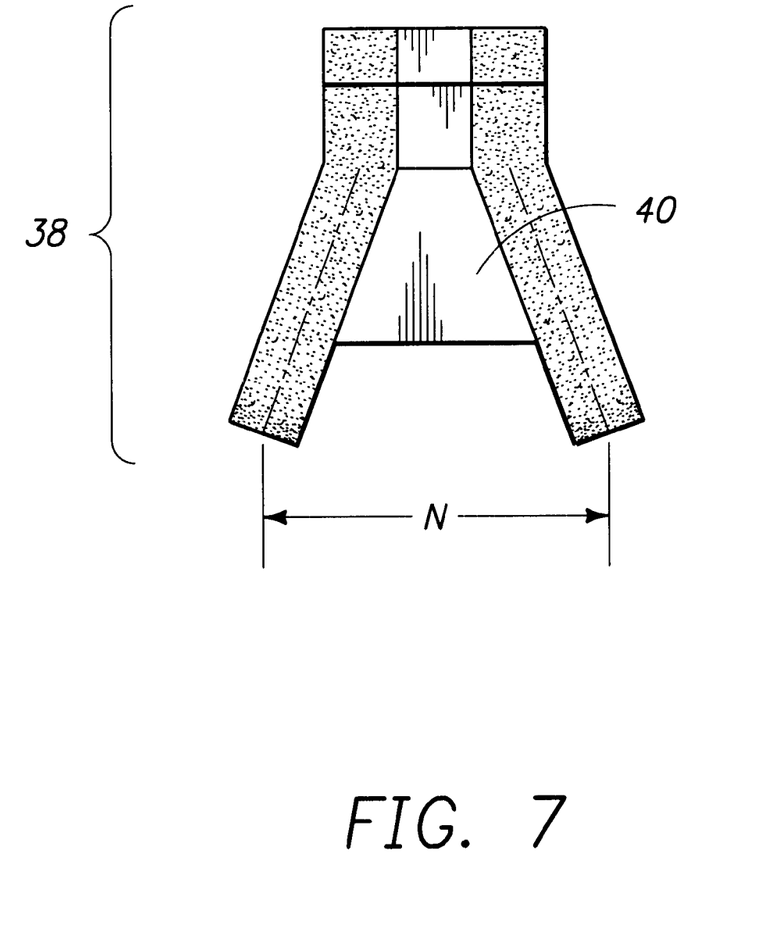
FIG. 7 is a top view of a final assembly used with any number of conventional seating means according to embodiments of the present invention as shown in FIG. 5.

Referring now to FIG.7, a top view shows that the desired portion triangular member 33 has been integrated as bottom cushion 40 of apparatus 38. It is noted that dimension N is variable and may be altered between different sizes based upon the application in question.

Turning now to FIG. 8, To impart a proper angle to the spine of a user, the 'v-shaped' bottom cushion 44, of assembly 38, angles upward at an angle [theta] 48 upward from a point of contact 50 near the back of cushion 44 to a height of [for example, in the illustration of about four inches], having a mean angle of between about 1 and about 15 degrees. It is further noted that referring back to FIG. 4B, the angled v-shaped cushion portion likewise is angled from a distal to a proximate end of the cushion measured by inclination angle 37 preferably from about 2.0 to about 2.8 degrees, most preferably under about 2.2 degrees. This angle has been discovered to facilitate an optimized lordotic loading , or impart to the spine a pareto-optimal "s"/sigmoid curvature asymptotically approaching the minimized loading posture.

Referring still to FIG. 8, a full view shows a schematized view of a car seat or airplane seat, but it is understood that the same do not limit the instant teachings. For example, most cushions sit flat, or below the lumbar line and therefore most seats make the lumbar support strike users in the thoracic region. Alternately, users move forward in the seat and rest their scapulas on the back. According to the instant teachings, the angle 48 compels a proper positioning of a user's spine in groove 55, which is defined by the dual density structure underlying the seat means 100.

By having a graduated 'v-shaped' bottom, the gluteur region is positioned properly to impart lordosis in any conventional seat means 100, in which apparatus 38 is installed. Likewise, the instant structure may be draped, attached on a top side of, embossed into, or otherwise connected to seating means.

Although the present invention has been described in terms of the preferred embodiments above, numerous modifications and/or additions to the above-described preferred embodiments would be readily apparent to one skilled in the art. It is intended that the scope of the present invention extends to all such modifications and/or additions and that the scope of the present invention is limited solely by the claims set forth below.

I claim:

1. A spinal disk protection and seat shock prevention system comprising:

a substantially vertical member with a first density, having a grooved face for receiving a user's back of a second density, comprised of at least foam, gel and polysiloxanes;

angled cushion means having, a distal and proximate end relative to the substantially vertical member, for receiving a user's ischial tuberosity integral therewith, and likewise being of two densities;

wherein an angle of inclination from said proximate end to said distal end ranges between about 1 to about 3 degrees, said first density ranging from abut 20 lbs. pressure sensitivity to about 200 lbs. pressure sensitivity; and, said second density ranging from about 1 lb. pressure sensitivity to about 83 lbs. pressure sensitivity.

2. A spinal disk protection and seat shock prevention system comprising:

a substantially vertical member with a first density, having a grooved face for receiving a user's back of a second density, comprised of foam, gel and polysiloxanes;

angled cushion means, having a distal and proximate end relative to the substantially vertical member, for receiving a user's ischial tuberosity integral therewith, and likewise being of two respective densities;

wherein an angle of inclination from said proximate to said distal end ranges between about 1 and about 3 degrees, said first density ranging from about 20 lbs. pressure sensitivity to about 200 lbs pressure sensitivity; and, said second density ranging from about 1 lb. pressure sensitivity to about 83 lbs. pressure sensitivity, wherein said angled cushion means, said angle of inclination from said proximate to said distal end ranges from between about 2.0 to about 2.8 degrees.

3. System as claimed in claim 2, wherein said system is incorporated within a seat for at least one of an automobile, an airplane, a truck, and a stationary seating unit for receiving a user's back or buttocks.

* * * * *